May 19, 1931. D. L. H. WILLIAMS 1,806,010
METHOD OF BRACING A CANTILEVER BEAM AGAINST TORSIONAL DEFLECTION
Filed Oct. 16, 1928
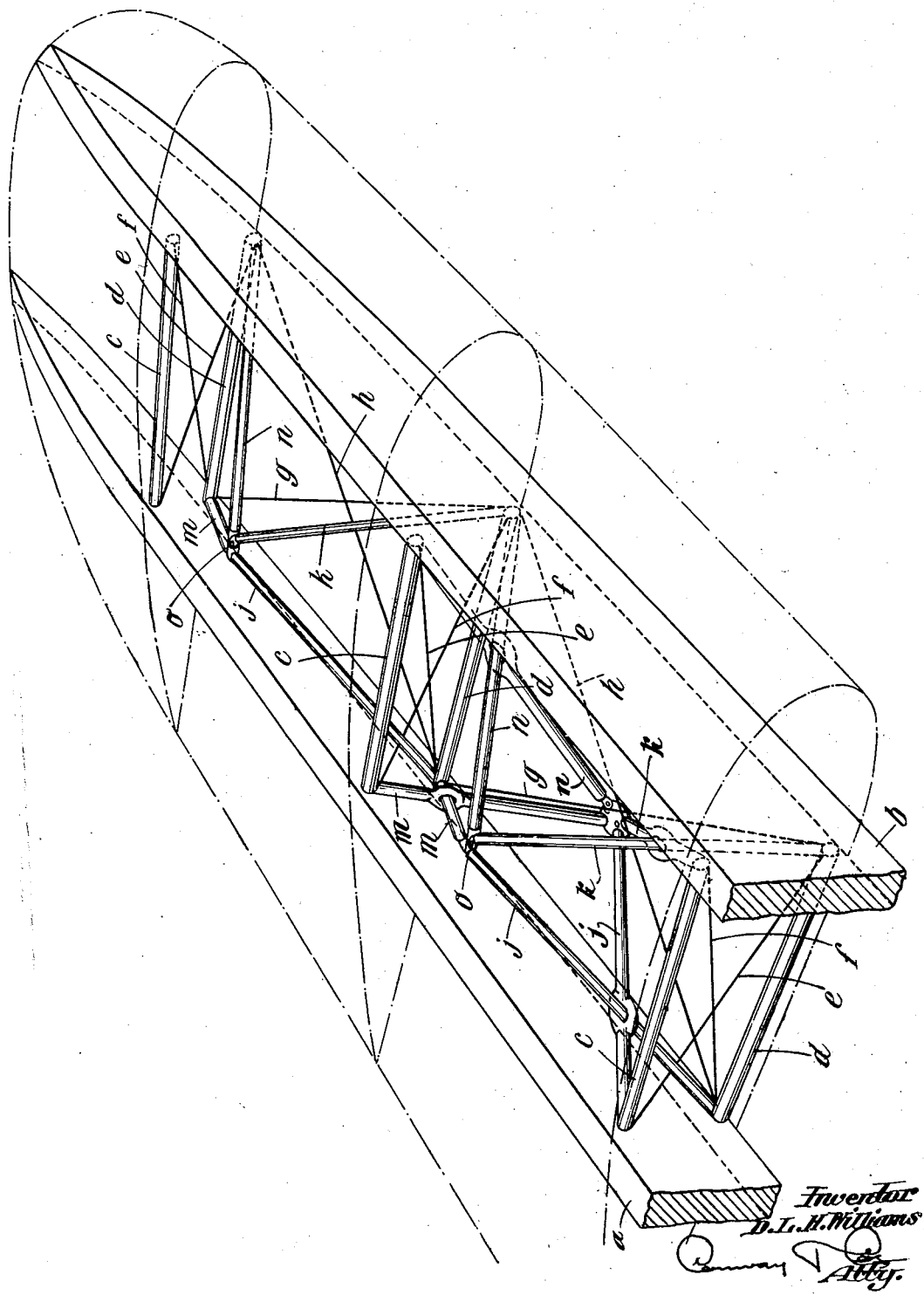

Patented May 19, 1931

1,806,010

UNITED STATES PATENT OFFICE

DAVID LEONARD HOLLIS WILLIAMS, OF ICKENHAM, ENGLAND, ASSIGNOR TO CHARLES RICHARD FAIREY, OF HAYES, ENGLAND

METHOD OF BRACING A CANTILEVER BEAM AGAINST TORSIONAL DEFLECTION

Application filed October 16, 1928, Serial No. 312,854, and in Great Britain November 16, 1927.

This invention relates to framed structures such as cantilever beams, in particular cantilever wings for aircraft, its object being to brace such structures against torsional deflection, and, for convenience, its nature will be set forth solely with reference to a cantilever wing for aircraft.

The usual construction of such a wing consists of two spars braced at the top and bottom and at each bulkhead, and is strong torsionally where the bulkheads are substantially square, but if the wing should bend, the bracing wires on the compression side of the spars become slackened and cannot operate to restrain torsion, with the result that the four corners, initially in the same plane, of any cellule, consisting of two spars and two bulkheads, will be distorted out of that plane.

According to the present invention a pyramid of rigid bracing members is built up with any one of the six sides of a cellule as its base and if desired similar pyramids may be built up on different bases, the bracing members being bifurcated or otherwise suitably formed to pass one another.

In this manner the four corners of the base of the pyramid are restrained against distortion from their initial common plane.

One form of this invention is shown in the accompanying drawing which is a diagrammatic perspective view of part of the structure of an aeroplane wing which is built up from two parallel spars $a$ $b$ between which extend pairs of tubular cross members $c$ $d$ the one $c$ above the other $d$, suitably braced as at $e$ $f$ and $g$ $h$ and constituting bulkheads and dividing the wing into a plurality of cellules. In each cellule is built up a pyramid of rigid tubular bracing members $j$ $k$ $m$ $n$ connected with one another at the apex of the pyramid and connected with the lower cross members $d$ $d$ of adjacent bulkheads, the junctions at the apex or at the base of the pyramid being pin jointed, welded, or similarly secured, as at $o$.

The height of the pyramid will be governed by the corresponding dimension of the cellule in which it is erected and preferably is substantially equal to said dimension.

Although, for convenience, the nature of the invention is set forth above solely with reference to a cantilever wing for aircraft, it is to be understood that it is applicable also to other framed structures.

I claim:—

1. A cantilever beam for aircraft wings comprising a plurality of rectangular cellules and bracing means comprising a pyramid of bracing members within each cellule and having one entire side of the cellule as its base.

2. A cantilever beam for aircraft wings comprising a plurality of rectangular cellules and bracing means comprising pyramids of bracing members within each of said cellules and having different sides of the cellules as their bases, said bracing members crossing one another and being bifurcated at the points of crossing.

3. A cantilever beam for aircraft wings comprising a plurality of rectangular cellules and bracing means comprising pyramids of bracing members within each of said cellules and having opposite sides of the cellules as their bases said bracing members crossing one another and being bifurcated at the points of crossing.

DAVID LEONARD HOLLIS WILLIAMS.